United States Patent [19]

Hackett, Jr.

[11] Patent Number: 4,513,383

[45] Date of Patent: Apr. 23, 1985

[54] SEPARATION OF COMMUNICATION SIGNALS IN AN ADAPTIVE ANTENNA ARRAY

[75] Inventor: Charles M. Hackett, Jr., Irvine, Calif.

[73] Assignee: Rockwell International Corporation, El Segundo, Calif.

[21] Appl. No.: 305,296

[22] Filed: Sep. 24, 1981

[51] Int. Cl.³ .......................... G06F 15/20; G01S 3/46

[52] U.S. Cl. .................................. 364/517; 343/5 DP; 343/5 NQ; 364/570; 364/582

[58] Field of Search ............... 364/516, 517, 570, 573, 364/581, 582; 343/5 DP, 5 NQ, 370, 372

[56] References Cited

U.S. PATENT DOCUMENTS

| | | | |
|---|---|---|---|
| 4,099,075 | 7/1978 | Goldberg et al. | 364/517 X |
| 4,117,538 | 9/1978 | Shrader et al. | 364/581 X |
| 4,180,814 | 12/1979 | Barton | 343/5 DP |
| 4,234,939 | 11/1980 | Grall | 364/517 X |

OTHER PUBLICATIONS

Bershad et al.: Sonar Array Detection of Gaussian Signals in Gaussian Noise of Unknown Power. IEEE Transactions on Aerospace and Electronic Systems vol. AES-10 No. 1 Jan. 1974, pp. 94-99.

Applebaum: Adaptive Arrays, IEEE Transactions on Antennas and Propagation vol. AP-24 No. 5 Sep. 76 pp. 585/598.

White: Cascade Preprocessors for Adaptive Antennas, IEEE Transactions on Antennas and Propagation, vol. AP-24, No. 5, Sep. 1976, pp. 670-684.

White: Adaptive Cascade Networks for Deep Nulling, IEEE Transactions on Antennas and Propagation, vol. AP-26, No. 3, May 1978, pp. 396-402.

Hackett, Jr.: Adaptive Arrays can be used to Separate Communication Signals, IEEE Transactions on Aerospace and Electronic Systems, vol. AES-17, No. 2, Mar. 1981, pp. 234-247.

Corrections to above AES-17 No. 4 Jul. 1981 p. 606

*Primary Examiner*—Felix D. Gruber

*Attorney, Agent, or Firm*—V. Lawrence Sewell; Howard R. Greenberg; H. Fredrick Hamann

[57] ABSTRACT

Method and apparatus are disclosed for separating radio frequency signals incident upon an array of antenna elements which has available from each of the elements an input signal capable of being processed by the method and apparatus. The processing includes combining the input signals according to a first set of complex weights, thereby providing a first output signal. The first set of weights is derived from the input signals and from the first output signal and converges to the eigenvector corresponding to the largest eigenvalue of the cross-correlation matrix of the complex envelopes of the input signals. The input signals are also combined according to a second set of complex weights to provide a second output signal. The second set of weights is derived from the input signals, from the second output signal and from the first set of weights. The second set of weights converges to the eigenvector corresponding to the second largest eigenvalue of said cross-correlation matrix. As a result of this processing, the first and second output signals respectively, correspond, in general, to the first and second most powerful signals incident on the array. Additional sets of weights can be developed to separate any additional signals.

11 Claims, 3 Drawing Figures

SEPARATION OF COMMUNICATION SIGNALS IN AN ADAPTIVE ANTENNA ARRAY

BACKGROUND OF THE INVENTION

This invention relates to separating communication signals with an adaptive antenna array. In particular, the present invention relates to separating a desired signal(s) from a jamming signal(s) when the form and direction of the desired signal are unknown.

Adaptive arrays of antenna elements have been applied to improve performance in radar systems for a number of years. More recently, they have been seriously considered for use in communication systems. In monostatic radar, the signal waveform and its direction of arrival are known to the receiver, so most earlier work on adaptive arrays has assumed knowledge of the signal waveform or its direction of arrival. For communications, these assumptions are usually not valid, so limited progress has been made to date in adapting radar results to communication systems.

In an article by the inventor in *IEEE Transactions on Aerospace and Electronic Systems,* Volume AES-17, No. 2, March 1981, pages 234–247, correction at No. 4, July 1981, page 606, incorporated herein by reference, it is mathematically demostrated that signals incident on an array can be separated using adaptive weights derived from eigenvectors of the cross-correlation matrix of the complex envelopes of the signals received from the antenna ports. The communication problem is modeled in the article along the same lines that S. P. Applebaum modeled the radar problem in *IEEE Transactions on Antennas and Propagation,* Volume AP-24, No. 5, September 1976, pages 585–598; however, the assumptions that the desired signal is small compared to the interference and that its direction of arrival is known are abandoned. The concept of eigenvector weighting described in the inventor's article has been used differently by W. D. White to separate signals, as described in *IEEE Transactions on Antennas and Propagation,* Volume AF-24, No. 5, September 1976, pages 670–684 and Volume AP-26, No. 3, May 1978, pages 396–402.

SUMMARY OF THE INVENTION

In accordance with the present invention, there is provided a practical method and apparatus for separating signals in accordance with the theory set forth in the inventor's article referenced above. The radio frequency signals to be separated are incident on an array of antenna elements, each of which provides an input signal to the invention. The input signals are combined according to a first set of complex weights to provide a first output signal which corresponds to one of the signals incident on the array. The first set of weights is derived from the input signals and from the first output signal. This set of weights becomes, in the steady state, one of the eigenvectors of the cross-correlation matrix of the complex envelopes of the input signals. Specifically, it is the eigenvector corresponding to the largest eigenvalue of the cross-correlation matrix.

To separate a second incident signal, the input signals are combined according to a second set of complex weights to provide a second output signal. The second set of weights are derived from the input signals, from the second output signal, and from the values of the first set of weights. This second set of weights converges to the eigenvector corresponding to the second largest eigenvalue of the cross-correlation matrix.

If further signals are to be separated, other sets of weights are derived in a manner similar to that for the second set.

The invention provides a practical implementation for separating incident signals under practical conditions for communications, including jamming. The invention is able to provide such separation without a knowedge of the form or direction of the desired signal(s) or undesired signal(s). In addition, the power of the desired signal may be much lower than, much greater than or comparable to that of an undesired signal. The desired and undesired signals can also be present sporadically.

One of the practical advantages of the invention is that it incorporates a way of generating the eigenvectors of the cross-correlation matrix for the input signals, without the substantial requirement of computing the matrix itself.

DESCRIPTION OF PREFERRED EMBODIMENTS

Figure 1:
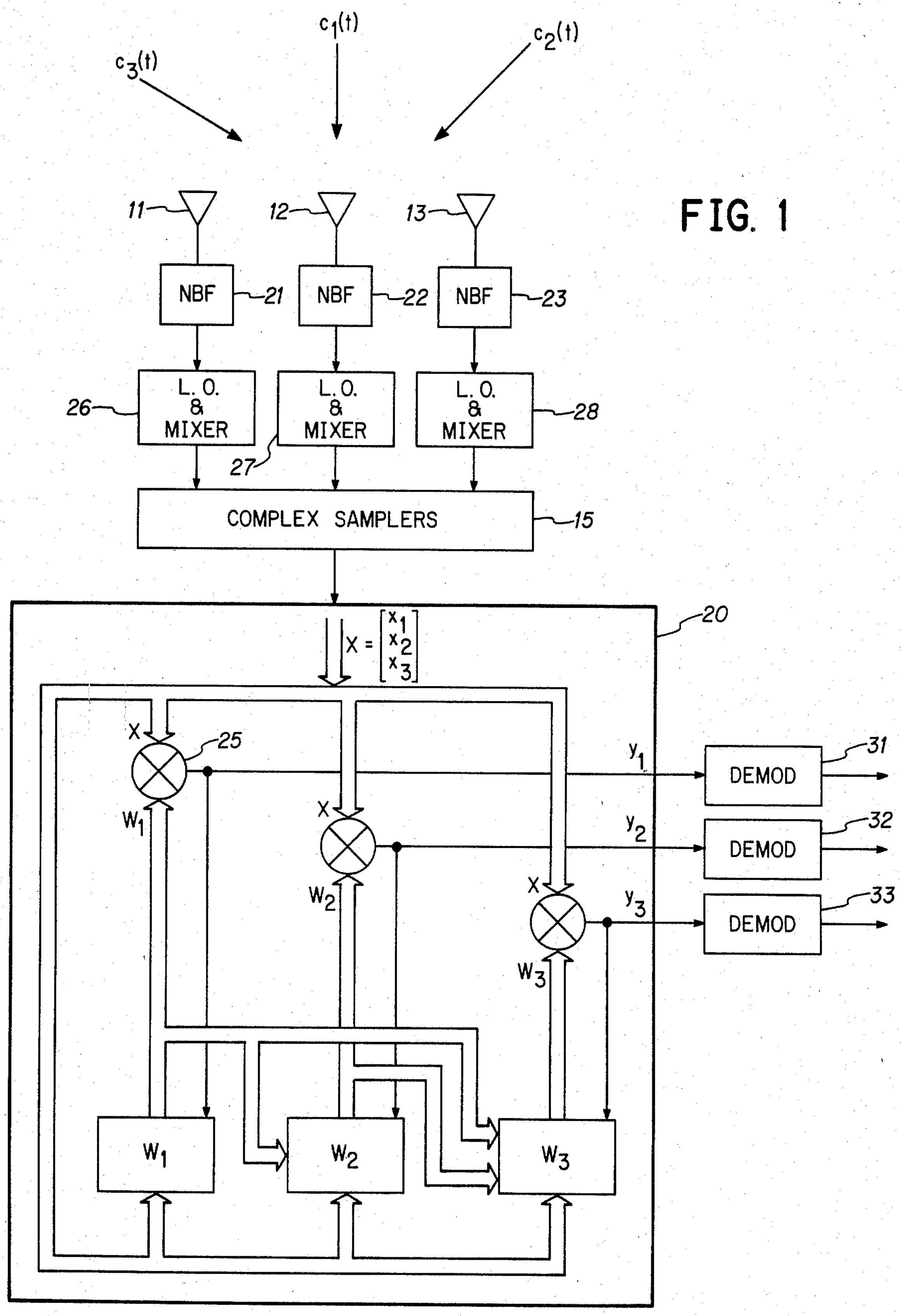
FIG. 1 is a high level block diagram of an apparatus in accordance with and carrying out the method of the invention.

FIG. 1 shows a high level block diagram of a three-element system in accordance with the invention. In this example system, an array of three antenna elements 11, 12 and 13 receives radio frequency energy from three incident signals $c_1(t)$, $c_2(t)$ and $c_3(t)$ arriving from three different directions.

The outputs of antennas 11–13 are filtered by narrow band filters 21–23, respectively, to provide narrow band signals. In a typical application, all the desired signals will have the same carrier frequency. This is the frequency used for filters 21–23. Local oscillators and filters 26–28 convert each signal to an intermediate frequency signal.

The apparatus and method of the invention will be for the most part described in terms of digital processing. Accordingly, the outputs of the local oscillators and mixers 26–28 are sampled by complex samplers 15, which generate samples of the complex envelope of each signal. For a modulated signal $s(t)=a(t)\cos(2\pi f_0 t+\phi(t))$, the complex envelope is defined as $c(t)=a(t)e^{j\phi(t)}$. The complex sampling can be performed either by taking pairs of samples spaced one quarter period apart or by first generating in-phase and quadrature baseband signals and sampling each of them. The samples are quantized by an analog-to-digital converter.

Thus, at each sample interval, complex samplers 15 provide to signal separator 20 three pairs of digital numbers. Each pair of numbers represents the real and complex parts of the signal from one of the antennas 11, 12 or 13.

The complex samples are received by signal separator 20, which in its digital form is preferably implemented with a digital computer such as a Collins Communication Microprocessor or an American Microsystems, Inc., device S2811. The processing of the signal separator 20 yields three time varying digital outputs $y_1$, $y_2$ and $y_3$. Each of these corresponds predominantly to one of the incident radio frequency signals $c_1(t)$, $c_2(t)$ or $c_3(t)$. Each of the outputs $y_1$, $y_2$ and $y_3$ can each be demodulated if necessary by an associated one of demodulators 31-33 to provide the baseband signal.

In the processing performed by signal separator 20, the input from the antenna elements is treated as a vector, X. The vector is regarded as a column vector, each component of which is a complex number $x_1$ corresponding to the latest sample of a particular one of the antenna element outputs. For example, the first component $x_1$ of X could represent the sampled value of the complex envelope of the signal from antenna element 11, while the second and third components are the samples of the complex envelopes from antenna elements 12 and 13, respectively.

In the drawings, double-line paths represent vectors, while signal-line paths represent scalars. The multiplier symbols, such as symbol 25, represent matrix multiplication when both inputs are vectors, and scalar weighting of a vector when one only input is a vector.

As indicated by the symbol 25, the first output signal $y_1$ from the signal separator is derived by matrix multiplication of X with a weighting vector $W_1$. $W_1$ is regarded as a row vector whose components $w_{lk}$ are complex numbers used to weight the input signals of X before summing them to derive the output signal $y_1$. Thus, $y_1 = w_{11}x_1 + w_{12}x_2 + w_{13}x_3$. The derivation of the weighting vector W1 will be described in detail in connection with FIG. 2. However, in FIG. 1, it can be seen that $W_1$ is derived from X and the output signal $y_1$ in an iterative solution.

The second output signal $y_2$, which is comprised predominantly of a second one of the incident signals, $c_k(t)$, is provided by matrix multiplication of X and a second weighting vector $W_2$. Vector $W_2$ is computed from values of X, $y_2$ and $W_1$. The third output $y_3$ is the result of the matrix multiplication of X and a weighting vector $W_3$. Vector $W_3$ is computed from X, $y_3$, $W_1$ and $W_2$.

Figure 2:
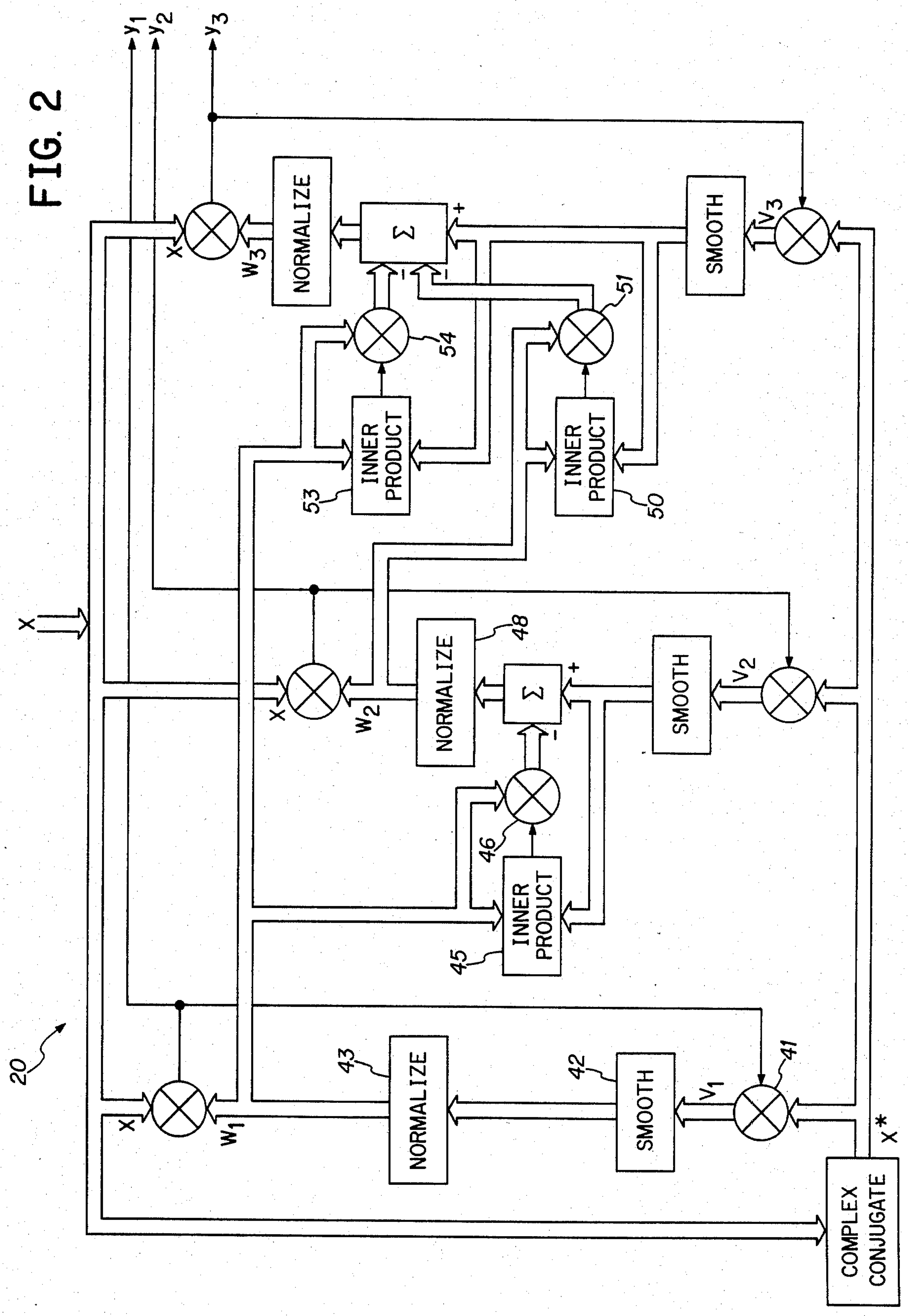
FIG. 2 is a block diagram of the signal separator of the apparatus of FIG. 1, as digitially implemented.

Details of the signal separator 20 are shown in FIG. 2. In computing each of the weighting vectors $W_1$, $W_2$ and $W_3$, the complex conjugate X* is first computed, that is, a column vector having as its components the complex conjugates of corresponding components of X. Then for the computation of the weighting vector $W_1$, the next step as indicated by operation 41 in FIG. 2, is to multiply the vector X* by $y_1$. The resulting product $V_1$ is a column vector, having as components, the components of X*, each multiplied by the complex number $y_1$. As can be seen in FIG. 2, the computations of $W_2$ and $W_3$ involve the same operation, resulting in product vectors $V_2$ and $V_3$, respectively.

The next function in computing $W_1$ is smoothing function 42. This is an average of $V_1$ over a number of sample intervals. The purpose of this smoothing is to average out short term fluctuations in $V_1$ due to the modulation of the incident communication signal. As an example, if the modulating signal has a 1 kHz bandwidth, corresponding to a 1 ms time constant, then the time constant of the smoothing function 42 is preferably 10 ms or more. The effective time constant of the smoothing should be short with respect to changes in the incident waveforms caused by relative motion between the transmitter of the signal and the receiving antenna array. The same considerations apply to the smoothing of the vectors $V_2$ and $V_3$.

The final step in the computation of weighting vector $W_1$ is the normalizing function 43. This is the multiplication of each of the components of the smoothed $V_1$ by a normalizing constant, which will cause the resulting vector $W_1$ to be of unit length. The normalizing constant is computed by multiplying each component of the smoothed $V_1$ by its conjugate, then summing these products, computing the square root of the sum, then taking the reciprocal of the square root.

When computed as disclosed, $W_1$ will converge after several sample intervals to an eigenvector of the cross-correlation matrix of the inputs $x_i$. In particular, $W_1$ will approach that eigenvector corresponding to the largest eigenvalue of the cross-correlation matrix. Weighting X by $W_1$ provides an output signal $y_1$, which tends to be composed predominantly of that incident signal which has the highest power.

The cross-correlation matrix is given by $R=[r_{ij}]$, where $r_{ij}=x_i^*(t)x_j(t)$, and the $x_i(t)$ are the inputs to the signal separator from the antenna elements. In the literature, it is common to refer to the "covariance" matrix, rather than the cross-correlation matrix as is done herein. If the signals all have zero mean values, then the covariance matrix will be identical to the cross-correlation matrix. The present invention describes signal separation, not only for signals with zero means, but also for cases in which the signal means are not all zero; therefore, the more general cross-correlation matrix is employed herein.

The computation of weighting vector $W_2$ is more involved than that of $W_1$. As indicated by the function 45, a computation must be made of the inner product of $W_1$ and the smoothed value of $V_2$, having smooth components indicated as $\bar{v}_{ik}$. The resultant scalar, IP, is evaluated by $IP = w_{11}^*\bar{v}_{21} + w_{12}^*\bar{v}_{22} + w_{13}^*\bar{v}_{23}$. Then, as indicated by the multiplication function 46, $W_1$ is multiplied by the inner product IP. The result is subtrated from the smoothed value of $V_2$ before the normalization 48. This subtracts the projection of vector $W_2$ onto $W_1$ from the smoothed $V_2$.

The subtraction creates a vector $W_2$ which is orthogonal to $W_1$. Weighting vector $W_2$ approaches an eigenvector of the cross-correlation matrix, namely the eigenvector associated with the second largest eigenvalue of that matrix.

After normalization, the second output $y_2$ is derived by multiplying X and $W_2$, just as for $y_1$. The output $y_2$ tends to be predominantly composed of the second most powerful of the incident signals.

A consideration of the derivation of $W_3$ indicates how the weight vectors would be computed for any number of incident signals. As represented by functions 50 and 51, $W_2$ is used in the computation involving the inner product to develop a number which is subtracted from the smoothed value of $V_3$. Further, as indicated by functions 53 and 54, $W_1$ is used in the same manner to provide a value which is subtracted from the smoothed $V_3$.

Thus, each weighting vector has subtracted a factor dependent on its inner product with each of the preceding weighting vectors.

The weighting vector $W_3$ is the eigenvector of the cross-correlation matrix which corresponds to the third largest eigenvalue. The output $y_3$ will tend to be comprised mainly of the third strongest signal.

A generalized description of the processing carried out by the invention is as follows. The number of incident radio frequency signals, such as $c_1(t)$, will be represented by the variable m. The number of antenna elements, such as antennas 11–13, in the receiving array wil be represented by the variable n. Each of the time varying signals from the antenna elements gives rise to a corresponding input signal to signal separator 20. The input signals $x_1 \ldots x_n$ are expressible as a vector X. The signal separator 20 carries out the following steps:

Computing the weighted combination of the input signals for each set of weights in an ordered sequence of sets of weights, from a first set through an n-th set, each set expressible as vector in the sequence $W_1 \ldots W_n$, with each of the resulting n computed combinations providing an output signal, designated with an index i as $y_i$, and associated with the i-th set of weights $W_i$ Forming, for each one of the n output signals, a set of products expressful as a vector, of the one output signal and the complex conjugates X* of the input signals, and time smoothing each of the sets of products For each of the n sets of smoothed products, modifying the i-th one of the smoothed product vectors associated with the i-th output signal, by

- forming the inner products of the i-th smoothed product vector and each of the weighting vectors $W_1 \ldots W_{i-}$ which precedes the i-th weighting vector in the weighting vector sequence, and
- multiplying each of the weighting vectors $W_1 \ldots W_{i-}$ with the corresponding inner product resulting therefrom and subtracting the results from the i-th smoothed product vector, and for each of the n modified sets of smoothed products, normalizing the modified i-th set of smoothed products to provide the i-th set of weights, approaching that eigenvector of the cross-correlation matrix of the complex envelopes of the time varying signals which corresponds to the i-th largest eigenvalue of the matrix.

In accordance with the examples for i=1, 2 and 3 above, it can be seen that each output $y_i$ will be composed predominantly of that signal incident on the antennas which has the i-th highest power, provided m is less than or equal to n.

The signal separator has been implemented and tested using a computer simulation program, listed in the Appendix. Those statements which are a part of the signal separator logic have been enclosed in brackets in order to distinguish them from other statements required to generate test signals, determine performance, allocate memory, and so forth. The language of the program is FORTRAN.

Considering the program in combination with the preceding description, those skilled in the art can immediately understand details of the computations used to implement the invention. For example, the multiplication of the weighting vector W and X is performed at line 1290. The values of $v_k$ are computed at line 1320, including an accumulation which is equivalent to smoothing. The smoothing can also be performed using a moving average over a number of sample intervals consistent with the criteria described above. Normalization is performed by a subrountine call NORMAL, which embodies the computation of the normalizing factor described above. The inner products are computed at line 1640, and the adjustment to produce orthoganality is done at line 1720.

Figure 3:
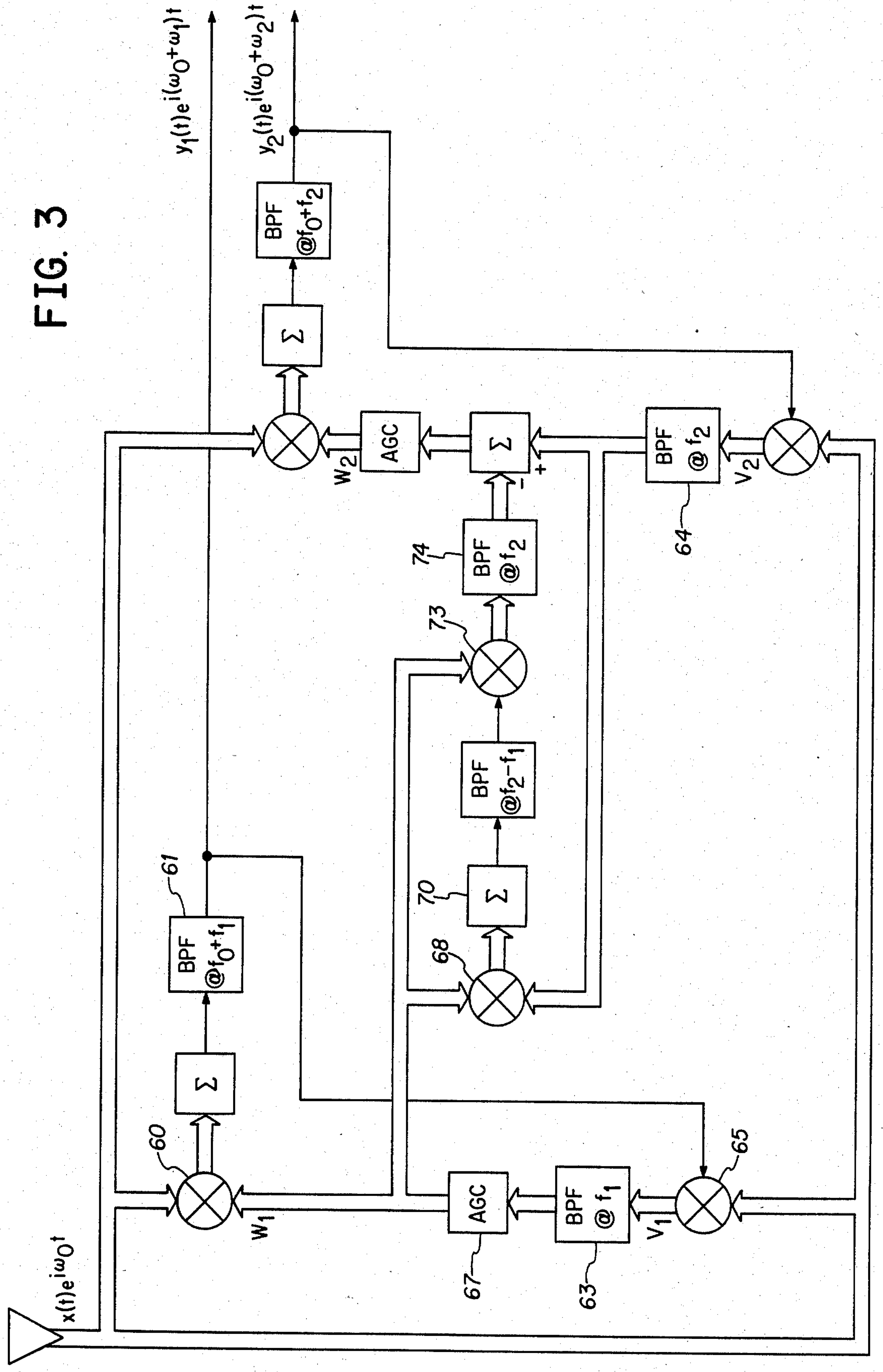
FIG. 3 is a block diagram of a signal separator employing analog circuitry.

FIG. 3 shows a two-dimensional signal separator 20 implemented with analog hardware. As in FIG. 1, it is often preferable to filter and convert in order to provide a narrow band i-f signal to the separator. As in the other figures, the double line paths indicate vector transfer and the single line paths indicate scalar transfer. The labels on the paths indicate the analytic signal present in that path. The physical signal is the real part of the analytic signal, and the complex envelope is obtained from the analytic signal by deleting the complex exponential factor.

The multiplier symbols such as multiplier 60 are here interpreted to be analog mixers. When both inputs to the mixer are vectors, the mixing is done componentwise. When one input is a vector and the other is scalar, each component of the vector is mixed with the scalar. The bandpass filter such as filter 61 that follows each mixer selects either the sum- or dfference-frequency component as indicated. In addition to performing this function, the bandpass filters 63 and 64 also act as smoothing filters.

The analysis of the digital embodiments applies to the circuitry of FIG. 3 as well. The function of mixer 65, in mixing the first output signal $y_1(t)$ and the input signals, followed by the action of bandpass filter 63 at frequency $f_1$, produces the same result as the operations $X^*y_1$ followed by smoothing in FIG. 2. The action of the AGC circuit 67 provides the result of normalizing function 43 in FIG. 2.

As in the digital implementation, the derivation of the weights for a second channel or further channels is more complicated than for forst channel. A mixer set 68 and summation 70, followed by bandpass filtering at $f_2-f_1$ provide an inner product. The action of an additional mixer 73 and bandpass filter 74 at frequency $f_2$ provide the outputs which must be subtrated to produce an orthogonal weighting vector $W_2$.

The desired signals $y_1(t)$ and $y_2(t)$ appear as the complex envelopes of the analytic signals of the outputs in FIG. 3. As indicated in the figure, their carrier frequencies are different. However, these can be modified if desired by subsequent heterodyning.

From a consideration of the foregoing, it can be seen how the method and apparatus of the invention provide a practical implementation for separating incident communication signals, which can include jamming. The invention is able to provide such separation without a knowledge of the form or direction of the desired signals or undesired signals.

APPENDIX

```
100=  PROGRAM SSSIM (INPUT,OUTPUT,
      TAPE5=INPUT,TAPE6=OUTPUT)
110=* SSSIM SIMULATES THE SIGNAL-SEPARATOR
      ALGORITHM
120=  REAL PINDB(8),PIN(8),THETA(8),EVAL(8),
      WK(80),A(8)
130=  REAL.PHI(8),POUT(8)
140=  COMPLEX GA(8,8),GG(8,8),GT(8,8),R(8,8),RS(36),
      EVEC(8,8)
150=  COMPLEX C(8,64),V(8,8),W(8,8),X(8),Y(8),WW(8,8)
160=  COMPLEX B(8),X0(8,64),F(64,8)
170=  PI=3.141592654
180=  TPI=2*PI
190=  OMEGA=PI/32
200=  DATA N,M/4,3/
210=* N IS NUMBER OF ANTENNA ELEMENTS
220=* M IS NUMBER OF INCIDENT SIGNALS
230=  DATA BETA,AG,IP/1.,.125,64/
240=* BETA IS ELEMENT SPACING IN
      HALF-WAVELENGTHS
250=* AG IS THE INTEGRATOR GAIN
260=* IP IS THE COMPUTATION PERIOD
270=  PRINT90,M,N,BETA,AG,IP
```

APPENDIX-continued

```
280=  90 FORMAT
      (4H0M =I3,6H N =I3,9H BETA =F6.3,7H
      AG =,F7.4,7H
290=  I=,I3)
300=  DATA THETA/30.,-40.,0.,70.,10.,-60.,-90.,65./
310=* THETA(K) IS THE ANGLE-OF-ARRIVAL (FROM
      NORMAL) OF THE KTH
320=* SIGNAL
330=  DATA PINDB/20.,10.,0.,40.,30.,5.,15.,20./
340=* PINDB(K) IS THE INPUT POWER IN DB OF
      THE KTH SIGNAL
350=  DATA PHI/1.5,.4,.1,5.2,2.,2.3,.9,3.3/
360=* PHI(K) IS THE PHASE ANGLE OF THE COMPLEX
      ENVELOPE THE KTH SIGN
370=  PRINT91
380=  91 FORMAT(*0 K PINDB THETA PHI*)
390=  PRINT92,(K,PINDB(K),THETA(K),PHI(K),K=1,M)
400=  92 FORMAT(I3,E8.2,2F7.1)
410=  DO 12 K=1,M
420=  PIN(K)=10.**(.1*PINDB(K))
430=* A(K) IS THE AMPLITUDE OF THE KTH SIGNAL
440=  A(K)=SQRT(2*PIN(K))
450=  DO 12 L=1,N
460=  GA(L,K)=1
470=* GA(L,K) IS THE COMPLEX GAIN OF THE LTH
      ELEMENT TO THE KTH
480=* SIGNAL
490=  ULK=
      BETA*PI*(L-(N+1)/2.)*SIN(PI/180*THETA(K))
500=* ULK ACCOUNTS FOR THE PHASE-SHIFT OF THE
      KTH SIGNAL GOING
510=* THRU THE LTH PORT
520=  GG(L,K)=1.*CEXP(CMPLX(0.,ULK))
530=* GG(L,K) IS THE COMPLEX GAIN OF THE LTH
      PORT OF THE ARRAY TO
540=* THE KTH SIGNAL
550=  12 GT(L,K)=GG(L,K)*GA(L,K)
560=* GT(L,K) IS THE TOTAL COMPLEX GAIN OF THE
      LTH ELEMENT TO THE
570=* KTH SIGNAL
580=  IJ=0
590=  DO 14 I=1,N
600=  DO 14 J=1,I
610=  IJ=IJ+1
620=  RS(IJ)=0
630=  DO 16 K=1,M
640=  16 RS(IJ)=RS(IJ)+CONJG(GT(I,K))*GT(J,K)*2*PIN(K)
650=  R(I,J)=RS(IJ)
660=  R(J,I)=CONJG(RS(IJ))
670=  14 CONTINUE
680=* RS IS THE CROSS-CORRELATION MATRIX OF
      THE COMPLEX ENVELOPES OF T
690=* INPUT SIGNALS AND NOISE STORED IN
      THE "HERMITIAN MODE"
700=* R IS RS IN ORDINARY FORM
710=  PRINT83
720=  83 FORMAT(*0 CROSS-CORRELATION MATRIX*)
730=  IJ=0
740=  DO 17 I=1,N
750=  IJ=IJ+I-1
760=  17 PRINT80,(RS(IJ+J),J=1,I)
770=  80 FORMAT(8(1X,2F7.2))
780=  CALL EIGCH(RS,N,2,EVAL,EVEC,8,WK,IER)
790=* EIGCH COMPUTES THE EIGENVALUES AND
      THE EIGENVECTORS OF RS
800=  99 FORMAT (1H )
810=  96 FORMAT
      (14H ERROR INDEX =,I4,3X,12HPERF
      INDEX =,F10.5)
820=  IF(IER.NE.0.OR.WK(1).GT.1) PRINT 96,IER,WK(1)
830=* AN ERROR MESSAGE IS PRINTED IF THERE WAS
      ANY PROBLEM IN EIGCH
840=  PRINT93,(EVAL(I),I=1,N)
850=  93 FORMAT(*0EIGENVALUES*,8F12.5)
860=  PRINT98
870=  98 FORMAT(*0EIGENVECTORS (COLUMNS)*)
880=  DO 18 I=1,N
890=  18 PRINT94,(EVEC(I,J),J=1,N)
900=  94 FORMAT(8(1X,2F6.4))
910=  PRINT89
920=  89 FORMAT
      (4H0 I,4X,1HK,6X,6HW(1,K),7X,6HW(2,K),7X,
      6HW(3,K),7X,6HW
930=  1K),5X,5HSIRDB)
940=  DO 08 L=1,N
950=  DO 08 K=1,N
960=  W(L,K)=0
970=  IF(L.EQ.K) W(L,K)=1
980=  08 CONTINUE
990=* THE WEIGHTING VECTORS HAVE BEEN
      INITIALIZED
1000=  DO 06 I=1,64
1010=  DO 05 K=1,M
1020=  05 C(K,I)=
       A(K)*CEXP(CMPLX(0.,K*OMEGA*I+PHI(K)))
1030=* C(K,I) IS THE COMPLEX ENVELOPE OF THE
       KTH SIGNAL AT THE CENTER
1040=* OF THE ARRAY
1050=  DO 06 L=1,N
1060=  X0(L,I)=0
1070=  DO 06 K=1,M
1080=  06 X0(L,I)=X0(L,I)+GT(L,K)*C(K,I)
1090=* X0(L,I) IS THE COMPOSITE SIGNAL AVAILABLE
       AT THE LTH PORT
1100=* X0(L,I) IS A PERIODIC SIGNAL WITH 64
       SAMPLES/PERIOD
1110=  IT=0
1120=  10 I=MOD(IT,64)+1
1130=* I COUNTS TIME WITHIN EACH SIGNAL PERIOD
1140=  IT=IT+1
1150=* IT COUNTS TIME FROM ZERO
1160=  IF(I.NE.1) GO TO 02
1170=  DO 22 K=1,N
1180=  DO 24 L=1,N
1190=  24 V(L,K)=0
1200=* V(L,K) IS INITIALIZED
1210=  DO 22 J=1,4
1220=  22 F(J,K)=0
1230=* FFT'S OF OUTPUTS ARE INITIALIZED
1240=  02 DO 3 L=1,N
1250=  03 X(L)=X0(L,I)
1260=  DO 31 K=1,N
1270=  Y(K=0
1280=  DO 20 L=1,N
1290=  20 Y(K)=Y(K)+W(L,K)*X(L)
1300=* Y(K) I THE SIGNAL OUTPUT FROM THE
       KTH CHANNEL
1310=  DO 25 L=1,N
1320=  25 V(L,K)=V(L,K)+Y(K)*CONJG(X(L))
1330=  DO 23 J=1,4
1340=  23 F(J,K)=F(J,K)+Y(K)*CEXP(CMPLX(0.,-TPI*J*I/64))
1350=* F(J,K) IS THE JTH COMPONENT OF THE
       64-POINT DFT OF Y(K)
1360=  IF(I.NE.64) GO TO 31
1370=  IF(K.EQ.1) PRINT99
1380=  DO 21 J=1,4
1390=  21 POUT(J)=CONJG(F(J,K))*F(J,K)/8192
1400=* POUT(J) IS THE POWER IN THE JTH FREQUENCY
       CELL
1410=  PT=0
1420=  DO 36 J=1,N
1430=  IF(J-K) 37,38,37
1440=  37 PT=PT+POUT(J)
1450=  GO TO 36
1460=  38 PS=POUT(J)
1470=  36 CONTINUE
1480=  SIRDB=10*ALOG10(PS/PT)
1490=* SIRDB IS THE SIGNAL-TO-INTERFERENCE RATIO
       OF THE JTH OUTPUT SIGNAL
1500=  97 FORMAT(I5,I4,1X,4(1X,2F6.4),F8.2)
1510=* V(L,K) IS THE "NEW ESTIMATE" OF W(L,K)
1520=  IF(MOD(I,IP).NE.0) GO TO 31
1530=* WEIGHT UPDATING IS DONE EVERY
       IP-TH SAMPLE
1540=  PRINT97,IT,K,(W(L,K),L=1,N),SIRDB
1550=  CALL NORMAL(V,V,K,N)
1560=  DO 26 L=1,N
1570=  26 W(L,K)=AG*W(L,K)+(1-AG)*V(L,K)
1580=* THE OLD W(L,K) AND V(L,K) ARE COMBINED
       TO FORM THE NEW W(L,K)
1590=  CALL NORMAL(W,W,K,N)
1600=  DO 43 IX=1,N
1610=  DO 43 JX=1,IX
```

APPENDIX-continued

```
1620=  WW(IX,JX=0
1630=  DO 44 IW=1,N
1640=  44 WW(IX,JX)=WW(IX,JX)+
       CONJG(W(IW,IX))*W(IW,JX)
1650=  WW(JX,IX)=CONJG(WW(IX,JX))
1660=* WW(I,J) IS THE INNER PRODUCT OF W(L,I) AND
       W(L,J)
1670=  43 CONTINUE
1680=  IF(K.EQ.1) GO TO 31
1690=  KM=K-1
1700=  DO 45 IY=1,KM
1710=  DO 45 L=1,N
1720=  45 W(L,K)=W(L,K)-WW(IY,K)*W(L,IY)
1730=* W(L,K) IS RESTRICTED TO THE SPACE
       ORTHOGONAL TO W(L,K-1),...,W(L,1)
1740=  CALL NORMAL(W,W,K,N)
1750=  31 CONTINUE
1760=  30 IF(IT.LT.512) GO TO 10
1770=  PRINT87
1780=  87 FORMAT(5H0 W)
1790=  DO 71 K=1,N
1800=  71 PRINT94,(W(L,K),L=1,N)
1810=  PRINT86
1820=  86 FORMAT(7H0 RW )
1830=  DO 66 K=1,N
1840=  DO 58 I=1,N
1850=  B(I)=0
1860=  DO 58 J=1,N
1870=  58 B(I)=B(I)+R(I,J)*(W(J,K))
1880=  SB=0
1890=  DO 56 I=1,N
1900=  56 SB=SB+B(I)*CONJG(B(I))
1910=  DO 55 I=1,N
1920=  55 B(I)=B(I)/SQRT(SB)
1930=* B(K) =R CONJG(W(K)) (TO SEE HOW CLOSE W(K)
       IS TO EVEC(K))
1940=  66 PRINT94,(B(I),I=1,N)
1950=  STOP
1960=  . END
1970=  SUBROUTINE NORMAL(X,Y,J,N)
1980=* THIS SUBROUTINE RETURNS Y, THE RESULT OF
       NORMALIZING THE INPUT X
1990=  COMPLEX X(8,8),Y(8,8)
2000=  SSX=0
2010=  DO 10 I=1,N
2020=  10 SSX=SSX+X(I,J)*CONJG(X(I,J))
2030=  RRX=1/SQRT(SSX)
2040=  DO 11 I=1,N
2050=  11 Y(I,J)=RRX*X(I,J)
2060=  RETURN
2070=  END
```

I claim:

1. A method for separating m radio frequency signals incident on an array n antenna elements, wherein there is, for each element, a time-varying signal from the element and a corresponding input signal capable of being processed by the method, which input signal is generated from the time-varying signal and can be representative of its complex envelope, said method comprising:

computing the weighted combination of the input signals for each set of weights in an ordered sequence of sets of weights, from a first set through an n-th set, with each of the resulting n computed combinations providing an output signal, designated with an index i as $y_i$, and associated with the i-th set of weights;

forming, for each one of the n output signals, a set of products of the one output signal and the complex conjugates of the input signals, and time smoothing each of said sets of products;

for each of the n sets of smoothed products, modifying the i-th set of smoothed products associated with the i-th output signal, in response to all of the sets of weights which precede the i-th set of weights in said sequence; and for each of the n modified sets of smoothed products, normalizing the modified i-th set of smoothed products to provide the i-th set of weights, approaching that eigenvector of the cross-correlation matrix of the complex envelopes of said time-varying signals which corresponds to the -th largest eigenvalue of the matrix, whereby each of said output signals corresponds predominately to a different one of said incident radio frequency signals for m less than or equal to n.

2. A method for separating m radiating signals incident on an array of n receiving elements, wherein there is, for each element, a time-varying signal derived from the element and a corresponding input signal capable of being processed by the method, which input signal is generated from the time-varying signal and can be representative of its complex envelope, said method comprising:

computing the weighted combination of the input signals for each set of weights in ordered sequence of sets of weights, from a first set through an n-th set, with each of the resulting n computed combinations providing an output signal, designated with an index i as $y_i$, and associated with the i-th set of weights;

forming, for each one of the n output signals, a set of products of the one output signal and the complex conjugates of the input signals, and time smoothing each of said sets of products;

for each of the n sets of smoothed products, modifying the i-th set of smoothed products associated with the i-th input signal, in response to all of the sets of weights which precede the i-th set of weights in said sequence; and for each of the n modified sets of smoothed products, normalizing the modified i-th set of smoothed products to provide the i-th set of weights, approaching that eigenvector of the cross-correlation matrix of the complex envelopes of said time-varying signals which corresponds to the i-th largest eigenvalue of the matrix, whereby each of said output signals corresponds predominantly to a different one of said incident signals for m less than or equal to n.

3. A method for separating m radio frequency signals incident on an array of n antenna elements, wherein there is, for each element, a time-varying signal derived from the element and a corresponding input signal capable of being processed by the method, which input signal is generated from the time-varying signal and can be representative of its complex envelope, said method comprising:

multiplying a vector, which has as components the input signals, by each weighting vector in an ordered sequence of weighting vectors, from a first through an n-th weighting vector, with each of the resulting n products providing an output signal, designated with an index i as $y_i$, and associated with the i-th weighting vector;

forming, for each one of the n output signals, the product of the one output signal and a vector having as components the complex conjugates of the input signals, and time smoothing each of the resulting n product vectors;

for each of the n smoothed product vectors, modifying the i-th smoothed product vector associated with the i-th output signal, in response to all of the weighting vectors which precede the i-th weighting vector in said sequence; and for each of the n modified smoothed product vectors, normalizing the modified i-th smoothed product vector to provide the i-th weighting vector, approaching that eigenvector of the cross-correlation matrix of the complex envelopes of said time-varying signals which corresponds to the i-th eigenvalue of the matrix, whereby each of said output signals corresponds predominantly to a different one of said incident signals for m less than or equal to n.

4. A method for separating m radiating signals incident on an array of n receiving elements, wherein there is, for each element, a time-varying signal derived from the element and a corresponding input signal capable of being processed by the method, which input signal is generated from the time-varying signal and can be representative of its complex envelope, said method comprising:

multiplying a vector, which has as components the input signals, by each weighting vector in an ordered sequence of weighting vectors, from a first through an n-th weighting vector, with each of the resulting n products providing an output signal, designated with an index i as $y_i$, and associated with the i-th weighting vector;

forming, for each one of the n output signals, the product of the one output signal and a vector having as components the complex conjugates of the input signals, and time smoothing each of the resulting n product vectors;

for each of the n smoothed product vectors, modifying the i-th smoothed product vector associated with the i-th output signal, in response to all of the weighting factors which precede the i-th weighting vector in said sequence; and for each of the n modified smoothed product vectors, normalizing the modified i-th smoothed product vector to provide the i-th weighting vector, approaching that eigenvector of the cross-correlation matrix of the complex envelopes of said time-varying signals which corresponds to the i-th largest eigenvalue of the matrix, whereby each of said output signals corresponds predominantly to a different one of said incident signals for m less than or equal to n.

5. The method of claim 3 or 4, wherein the step of modifying includes, for each one of said weighting vectors which precedes the i-th weighting vector;

forming the inner product of said one preceding vector and said i-th smoothed product vector; and multiplying the one preceding vector by said inner product and subtracting the result from the i-th smoothed product vector.

6. The method of claim 4, wherein said input signals represent samples, as generated by a complex sampling operation, of the complex envelopes of the time-varying signals, and the steps of multiplying, forming, smoothing, modifying and normalizing are performed digitally and iteratively for a succession of said sample-representative input signals.

7. The method of claims 1 or 2, wherein the step of computing the weighted combination includes analog mixing said each set of weights and the input signals, and summing and band-pass filtering the results of the mixing at a sum frequency thereof.

8. The method of claims 1 or 2, wherein the steps of forming a set of products and time smoothing include analog mixing the input signals and said one output signal, and band-pass filtering the results of the mixing at a difference frequency thereof.

9. The method of claim 5, wherein the step of forming the inner product includes analog mixing of said one preceding vector and said i-th smoothed product vector, and summing and band-pass filtering the results of the mixing at a difference frequency thereof.

10. An apparatus for separating m radio frequency signals incident on an array of n antenna elements, wherein there is, for each element, a time-varying signal derived from the element and a corresponding input signal capable of being processed by the apparatus, which input signal is generated from the time-varying signal and can be representative of its complex envelope, said apparatus comprising:

means for computing the weighted combination of the input signals for each set of weights in an ordered sequence of sets of weights, from a first set through an n-th set, with each of the resulting n computed combinations providing an output signal, designated with an index i as $y_i$, and associated with the i-th set of weights;

means for forming, for each one of the n output signals, a set of products of the one output signal and the complex conjugates of the input signals, and time smoothing each of said sets of products;

means, for each of the n sets of smoothed products, for modifying the i-th set of smoothed products associated with the i-th output signal, in response to all of the sets of weigths which precede the i-th set of weights in said sequence; and means, for each of the n modified sets of smoothed products, for normalizing the modified i-th set of smoothed products to provide the i-th set of weights, approaching that eigenvector of the cross-correlation matrix of the complex envelopes of said time-varying signals which corresponds to the i-th largest eigenvalue of the matrix, whereby each of said output signals corresponds predominantly to a different one of said input signals for m less than or equal to n.

11. An apparatus for separating m radiating signals incident on an array of n receiving elements, wherein there is, for each element, a time-varying signal derived from the element and a corresponding input signal capable of being processed by the apparatus, which input signal is generated from the time-varying signal and can be representative of, its complex envelope, said apparatus comprising:

means for computing the weighted combination of the input signals for each set of weights in an ordered sequence of sets of weights, from a first set through an n-th set, with each of the resulting n computed combinations providing an output signal, designated with an index i as $y_i$, and associated with the i-th set of weights;

means for forming, for each one of the n output signals, a set of products of the one output signal and the complex conjugates of the input signals, and time smoothing each of said sets of products;

means, for each of the n sets of smoothed products, for modifying the i-th set of smoothed products associated with the i-th output signal, in response to all of the sets of weights which precede the i-th set of weights in said sequence; and means, for each of the n modified sets of smoothed products, for normalizing the modified i-th set of smoothed products to provide the i-th set of weights, approaching that eigenvector of the cross-correlation matrix of the complex envelopes of said time-varying signals which corresponds to the i-th largest eigenvalue of the matrix, whereby each of said output signals corresponds to a different one of said input signals for m less than or equal to n.

* * * * *